(12) United States Patent
Takacs

(10) Patent No.: US 10,299,360 B2
(45) Date of Patent: May 21, 2019

(54) SMART LIGHTING SYSTEM WITH ULTRA-LOW STANDBY CONSUMPTION

(71) Applicant: SORAA, INC., Fremont, CA (US)

(72) Inventor: Laszlo Takacs, Fremont, CA (US)

(73) Assignee: Soraa, Inc., Fremont, CA (US)

( * ) Notice: Subject to any disclaimer, the term of this patent is extended or adjusted under 35 U.S.C. 154(b) by 0 days.

(21) Appl. No.: 15/653,900

(22) Filed: Jul. 19, 2017

(65) Prior Publication Data

US 2018/0027638 A1  Jan. 25, 2018

Related U.S. Application Data

(60) Provisional application No. 62/364,137, filed on Jul. 19, 2016.

(51) Int. Cl.

| H05B 41/38 | (2006.01) |
| H05B 33/08 | (2006.01) |
| H05B 37/02 | (2006.01) |

(52) U.S. Cl.
CPC ......... *H05B 41/38* (2013.01); *H05B 33/0842* (2013.01); *H05B 37/0227* (2013.01); *H05B 37/0263* (2013.01); *Y02B 20/48* (2013.01)

(58) Field of Classification Search
CPC .......... G05D 23/1905; G05D 23/1934; G05B 15/02; G05B 2219/2642; G05B 2219/2614; H04W 4/005; H04W 4/70; H05B 33/0848
See application file for complete search history.

(56) References Cited

U.S. PATENT DOCUMENTS

2015/0276266 A1* 10/2015 Warren ................... H04W 4/70
700/300

* cited by examiner

*Primary Examiner* — Monica C King
(74) *Attorney, Agent, or Firm* — Fisherbroyles LLP

(57) ABSTRACT

A smart lamp comprising: a lamp; and a processor configured to operate said lamp, said processor having at least active and standby modes of operation, in said active mode, said processor uses a first communication protocol having a first power consumption, and, in said standby mode, said processor uses a second communication protocol having a second power consumption, wherein said first power consumption is significantly higher than said second power consumption.

24 Claims, 4 Drawing Sheets

SMART LIGHTING SYSTEM WITH ULTRA-LOW STANDBY CONSUMPTION

REFERENCE TO RELATED APPLICATION

This application is based on U.S. Provisional Application No. 62/364,137, filed Jul. 19, 2016, and hereby incorporated by reference.

FIELD OF INVENTION

In general, the invention relates generally systems having active and standby modes of operation, and, more specifically, the invention relates to smart lamps having low-power consumption in standby more.

BACKGROUND

Smart lighting systems (such as smart bulbs) need to monitor incoming signals even when they are in standby mode (emitting no light). This is necessary to respond to instructions such as turn-on, change intensity, change color, etc. A variety of protocols can be used to communicate with smart lamps—either wireless (Wife, Bluetooth . . . ) or wired (PLC . . . ). Typically, a communication chipset requires electrical power to monitor incoming signals, which leads to power consumption in standby mode. For modern communication protocols, this consumption can be on the order of 0.5 W, 1 W or more—an undesirably high value. Other, more basic, communication protocols can achieve a lower consumption (e.g. 0.1 W or lower) but only offer basic/low-throughput communication capabilities.

What is needed is a smart lighting system which can maintain a very low standby consumption while retaining a modern communication protocol. The present invention fulfils this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In one embodiment, the invention relates to a smart lamp comprising: (a) a lamp; and (b) a processor configured to operate the lamp, the processor having at least an active mode and a standby mode of operation, in the active mode, the processor uses a first communication protocol having a first power consumption, and, in the standby mode, the processor uses a second communication protocol having a second power consumption, wherein the first power consumption is significantly higher than the second power consumption.

In another embodiment, the invention relates to a smart lamp configured for electrical connection to a powerline, the lamp comprising: (a) at least a first and second chipset associated with first and second communication protocols, respectively, the first chipset consuming more power when enabled than the second chipset when enabled; (b) a detector configured for connection to the powerline; and (c) a processor configured to selectively enable one of the first and second chipsets based upon at least one trigger event on the powerline being detected by the detector.

In still another embodiment, the invention relates to a device connected to a powerline, comprising: (a) functional circuitry; (b) a connection to the powerline; and (c) a processor configured to operate the functional circuitry, the processor having at least an active mode and a standby mode of operation, in the active mode, the processor uses a first communication protocol having a first power consumption, and, in the standby mode, the processor uses a second communication protocol having a second power consumption, wherein the first power consumption is significantly higher than the second power consumption.

In still another embodiment, the invention relates to a method of operating a device having standby and active modes on a powerline. In one embodiment, the method comprises: (a) operating the device is the standby mode using a low-power communication protocol for communicating over said powerline; (b) switching from the low-power communication protocol to a high-power communication protocol when a particular event or signal is detected; and (c) operating the device is the active mode using the high-power communication protocol for communicating over the powerline.

DETAILED DESCRIPTION

Applicants have devised a method and system that maintains a very low standby consumption while using a relatively sophisticated communication protocol. The invention achieves this requirement by combining the use of two communication protocols: a basic, low-consumption protocol and an advanced, higher-consumption protocol. Each of such communication protocols may be associated with a respective chipset, herein referred to as the basic protocol chipset and advanced protocol chipset respectively. Alternatively, a single chipset may handle both protocols. In standby mode, the advanced protocol chipset is idled or otherwise duty-cycle controlled to a very low value, which does not draw significant power. The basic protocol chipset then monitors for a wake-up signal. Upon receiving such a signal, the chipset for the advanced protocol wakes up and can receive smart commands. The advanced protocol chipset returns to an idle state after a given time or when the lighting system returns to standby.

Figure 1A:
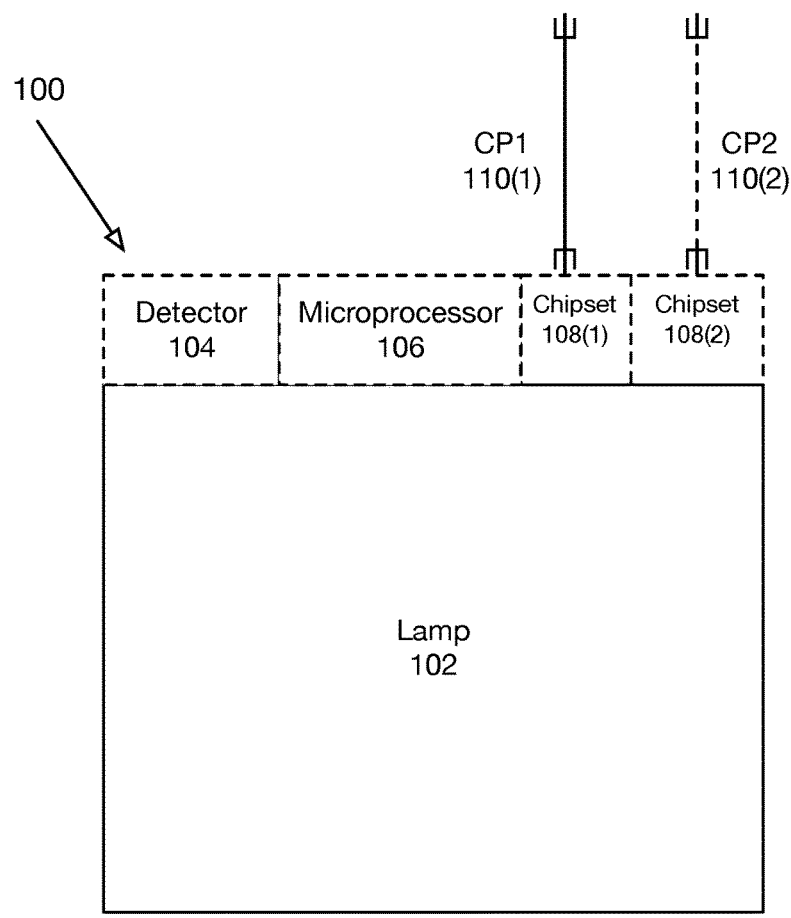
FIG. 1A is a block diagram of a system for providing ultra-low standby power consumption according to one embodiment.

Referring to FIG. 1A, a block diagram of one embodiment of a smart lamp 100 for providing ultra-low standby power consumption is shown. The smart lamp 100 comprises a lamp 102, which may comprise a light emitting diode (LED) or other conventional light source, and a processor 106 configured to operate the lamp. The processor has at least an active mode and a standby mode of operation. In the active mode, the processor uses a first communication protocol CP1 having a first power consumption, and, in the standby mode, the processor uses a second communication protocol CP2 having a second power consumption, wherein the first power consumption is significantly higher than the second power consumption.

In another embodiment, the smart lamp 100 is configured for electrical connection to a powerline (not shown). The smart lamp 100 comprises at least a first and second chipset 108(1), 108(2) associated with first and second communication protocols, respectively, the first chipset consuming more power when enabled than the second chipset when enabled. The smart lamp 100 also comprises a detector 104 configured for connection to the powerline and a processor 106 configured to selectively enable one of the first and second chipsets based upon at least one trigger event on the powerline being detected by the detector.

In yet another embodiment, the present invention may be practiced with any device that connects to a powerline and has active and standby modes. Such devices include, for example, lamps, appliances, HVAC units, telecommunication equipment, sensors, and cameras. In one embodiment, the device comprises functional circuitry (e.g., a lamp 102), a connection to the powerline (not shown), and a processor 106 configured to operate the functional circuitry. The processor has at least an active mode and a standby mode of operation. In the active mode, the processor uses a first communication protocol having a first power consumption, and, in the standby mode, the processor uses a second communication protocol having a second power consumption, wherein the first power consumption is significantly higher than the second power consumption.

For purposes of this discussion the mode in which the high-power consumption protocol is enabled and the low-power consumption protocol is disabled will be referred as the "active" state. The mode in which the low-power consumption protocol is enabled and the high-power consumption protocol is disabled will be referred to as the "standby" state. The "standby" state doesn't necessarily mean that lamp 102 is off/not emitting light. Rather, the "standby" state may be entered after some time (even when lamp 102 is on). Standby/active correspond to the communication state of lamp 102 (i.e., expecting data or not). The enablement/disablement of these modes does not imply that the lamp is emitting light or not.

Ultra-low standby power consumption circuit 100 may power lamp 102 and further comprises detector 104, microprocessor 106 and communication chipsets 108(1)-108(2). As shown in FIG. 1A, lamp 102 communicates with external devices via communication chipsets 108(1) and 108(2). Communication chipset 108(1) may utilize communication protocol CP1 (110(1)) for communication with external devices while communication chipset 108(2) may utilize communication protocol CP2 (110(2)) for communication with external devices. Further, although only two chipsets (108(1)-108(2)) and respective communication protocols (110(1)-110(2)) are shown in FIG. 1A, it will be understood that an arbitrary number of chipsets and associated communication protocols is compatible with the invention.

According to one embodiment, CP1 (110(1)) may be a high-power consumption protocol, which is a high-bandwidth multi-channel protocol such as a powerline communication (PLC) protocol such as HomePlug or GreenPhy protocol. For example, this protocol may utilize as many as 1024 simultaneous individual carrier frequencies and uses advanced DSP processing to extract and encode the data.

On the other hand, CP2 (110(2)) may be a low-power consumption protocol such as a basic 1-or-2 carrier protocol which is simply used for 0-1 signaling and does not require DSP to extract the signal. Examples of such low-power protocols are X-10 and the proprietary Insteon protocol. Another example is a many-carrier protocol (e.g. HomePlug GreenPhy) where nearly all of the carrier channels have been disabled, so that energy consumption is greatly reduced—for instance, only 2 or 4 out of 1024 channels are active. In yet another embodiment, the low-power consumption protocol is the high-power consumption protocol operated at a fraction of its clock speed, e.g., ½, ¼, ¹⁄₁₀, ¹⁄₂₀, or ¹⁄₁₀₀ clock speed of the first protocol. Still other embodiments will be obvious to those of skill in the art in light of this disclosure. For example, in still other embodiments, the low- and high-consumption protocols are based not only on power consumption of the communication protocol, but also on other functions with expensive power consumption. For instance, in the case of a lamp with a large processing power, the CPU may have a large power consumption at full power; or the lamp may have an accessory which consumes a large amount of power when in function.

In such embodiments, the standby mode is associated with a reduced power consumption from such power-consuming elements. For instance, the CPU, accessory, or other electronic components are slowed down or put to sleep. Here again, a networking signal may be used to switch the lamp to active state, where the power-consuming elements are active. This can be done in conjunction with lowering the power consumption of a communication protocol. In one embodiment, the lamp has a PLC communication chip, a CPU and an accessory; in standby mode, the PLC only uses a reduced number of carrier frequencies, the CPU is slowed down to a low-consumption mode and the accessory is depowered.

Communication protocols 110(1)-110(2) may include wired protocols, wireless protocols, or a combination thereof.

According to one embodiment, the low-power consumption mode ("standby"), which is operative when communication chipset 108(2) is enabled and communication chipset 108(1) is disabled may draw approximately 0.5 Watts or less (or less than 0.2 Watts, 0.1 Watts, 0.05 Watts, 0.01 Watts), while the high power mode ("active"), which is operative when communication chipset 108(1) is enabled and communication chipset 108(2) is disabled may draw 0.5 Watts or more. According to one embodiment, these exemplary power consumptions include the power required to operate the respective communication chipsets. In addition, power may be drawn by lamp 102 to emit light (for instance, 5 W, 10 W, or more) and to perform other functions associated with a smart lamp (e.g. power a sensor, etc.).

In some embodiments, communication protocols CP1 and CP2 are enabled by different chipsets. In other embodiments, they are enabled by the same chipset which can switch between the two protocols.

As previously noted, according to one embodiment, communication protocols CP1 (110(1)) and CP2 (110(2)) may be differentiated by respective number of carrier frequencies utilized. For example, chipset 108(1), which utilizes communication protocol CP1 110(1) may use a higher number of carrier frequencies while chipset 108(2), which utilizes communication protocol CP2 108(2) may use fewer carrier frequencies. In general, the number of carrier frequencies utilized correlates to a respective power drawn by communication circuit 108.

For instance, both protocols may be powerline communication (PLC)-based and handled by the same chipset. The chipset may be able to handle a large number of channels having varied carrier frequencies, for instance 1024 or more.

In active mode, CP1 uses all the available channels for high-bandwidth communication. In standby mode, CP2 only uses 1 (or 2, 4, 10) channel of the chipsets, which reduces consumption. The carrier waves can be modulated in different ways, including frequency, amplitude and pulse width modulation. In one embodiment, the modulation is frequency modulation. However, in other embodiments, the modulation is not only frequency-modulation based, and the communication channels are not directly defined by their modulation frequencies. Regardless, more channels may draw more power, and embodiments of the invention switch between higher and lower numbers of channels to control power consumption.

Detector 104 operates to determine if a change in operation of communication chipsets 108(1)-108(2) should be effected. According to one embodiment, upon detection of a signal or signals, detector 104 may communicate with microprocessor 106 to provide signals to microprocessor 106 based upon detected input at the detector 104 (i.e., a signal or signals at detector 104). Microprocessor 106 may then utilize such signals provided by detector 104 to control communication chipsets 108(1)-108(2). For example, microprocessor 106 may analyze detected signals provided by detector 104 and/or modify their format. According to one embodiment, microprocessor 106 operates to translate detected signals received by detector 104 into particular command-and-control signals based on such detected signals to control enabling or disabling of a particular communication chipset 108(1)-108(2).

In particular, according to one embodiment only one of communication chipsets 108(1)-108(2) is operating in an enabled state at a given time. To this end, detector 104 may receive input from any number of sensors and/or trigger a selection of the enablement/disablement of communication chipsets 108(1)-108(2) based on a number of different possible sceneries or signals, including, example, detecting at least one of a particular carrier frequency, a particular voltage, a particular amplitude, a particular pattern of signals, a particular signal, a particular operational state, or after a particular duration. Exemplary triggers for detector 104 will be described below. However, for present purposes detector 104 may detect weather lamp 102 is currently illuminated, for example, and based upon this information select a particular operation of communication circuit 108.

In some embodiments, the command to switch from standby to active mode is encoded by a bit or several bits. In other embodiments, it is merely triggered by a high-enough amplitude in a given channel.

Figure 1B:
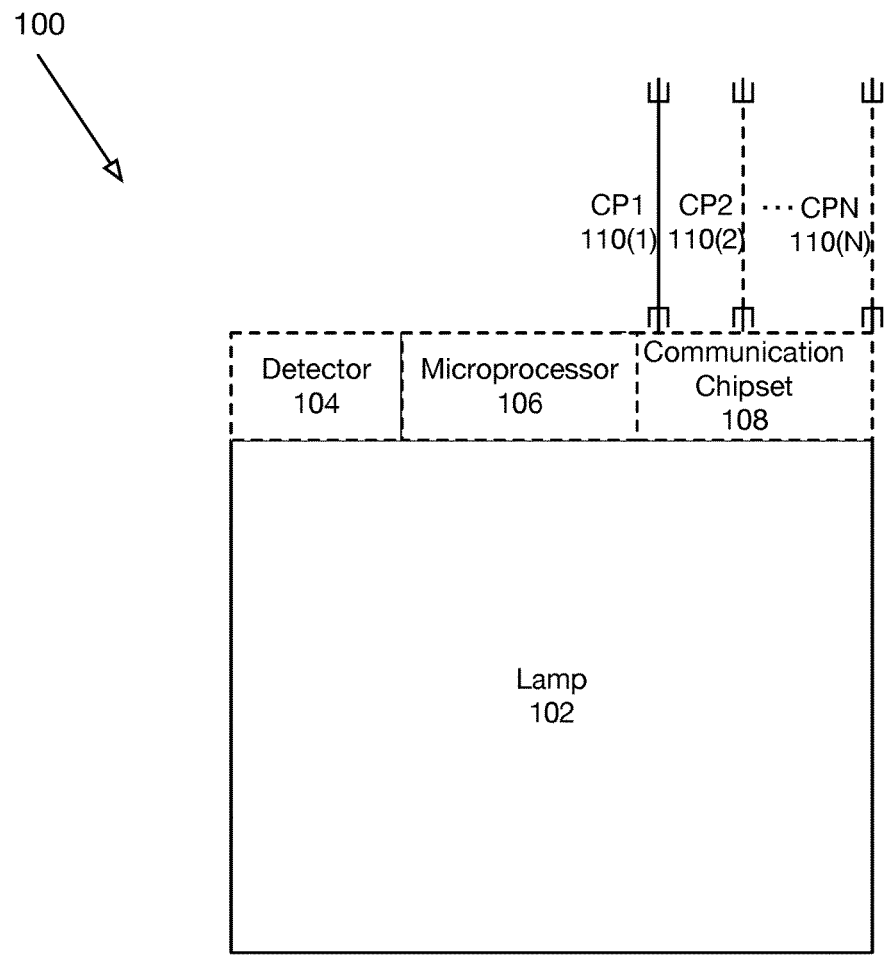
FIG. 1B is a block diagram of a system for providing ultra-low standby power consumption according to one embodiment.

FIG. 1B is a block diagram of a system for providing ultra-low standby power consumption according to one embodiment. Ultra-low standby power consumption circuit 100 may power lamp 102 and further comprises detector 104, microprocessor 106 and communication chipset 108. In contrast with the embodiment depicted in FIG. 1A, FIG. 1B shows a single communication chipset 108. In this embodiment, communication chipset 108 may selectively operate to utilize an arbitrary number of communication protocols CP1 (110(1))—CPN (110(N)) for communication with external devices. As shown in FIG. 1B, lamp 102 may communicate with external devices via communication chipset 108. According to one embodiment, communication protocols CP1-CPN (110(1)-110(N)) may be differentiated by a respective number of carrier frequencies utilized. For example, communication protocol 110(1) may use a relatively low number of carrier frequencies while communication protocol 110(2) may use a higher number of carrier frequencies. In general, the number of carrier frequencies utilized correlates to a respective power drawn by communication circuit 108. The advantage of utilizing a plurality of communication protocols 110(1)-110(N) will become evident as the invention is further described.

Detector 104 operates to determine if a change in operation of communication circuit 108 should be effected. According to one embodiment, detector 104 may communicate with microprocessor 106 to provide signals based upon detected input at the detector 104. Microprocessor 106 may then utilize such signals provided by detector 104 to control communication circuit 108. For example, microprocessor 106 may analyze detected signals provided by detector 104 and/or modify their format. In general, communication circuit 108 may require a particular protocol for control and selection of particular communication protocols (110(1)-110(N)). Microprocessor 106 operates to translate detected signals received by detector 104 into particular command-and-control signals based on such detected signals to control communication circuit 108.

In particular, according to one embodiment, detector 104 may operate to control selection of a particular communication protocol (e.g., 110(1)-110(N)), for example to select operation of a lower or higher power consumption mode. Detector 104 may receive input from any number of sensors and/or trigger a mode change of communication circuit 108 based upon an arbitrary number of criteria. Exemplary triggers that are operative for detector 104 will be described below. However, for present purposes detector 104 may detect weather lamp 102 is currently illuminated, for example, and based upon this information select a particular operation of communication circuit 108.

Figure 2:
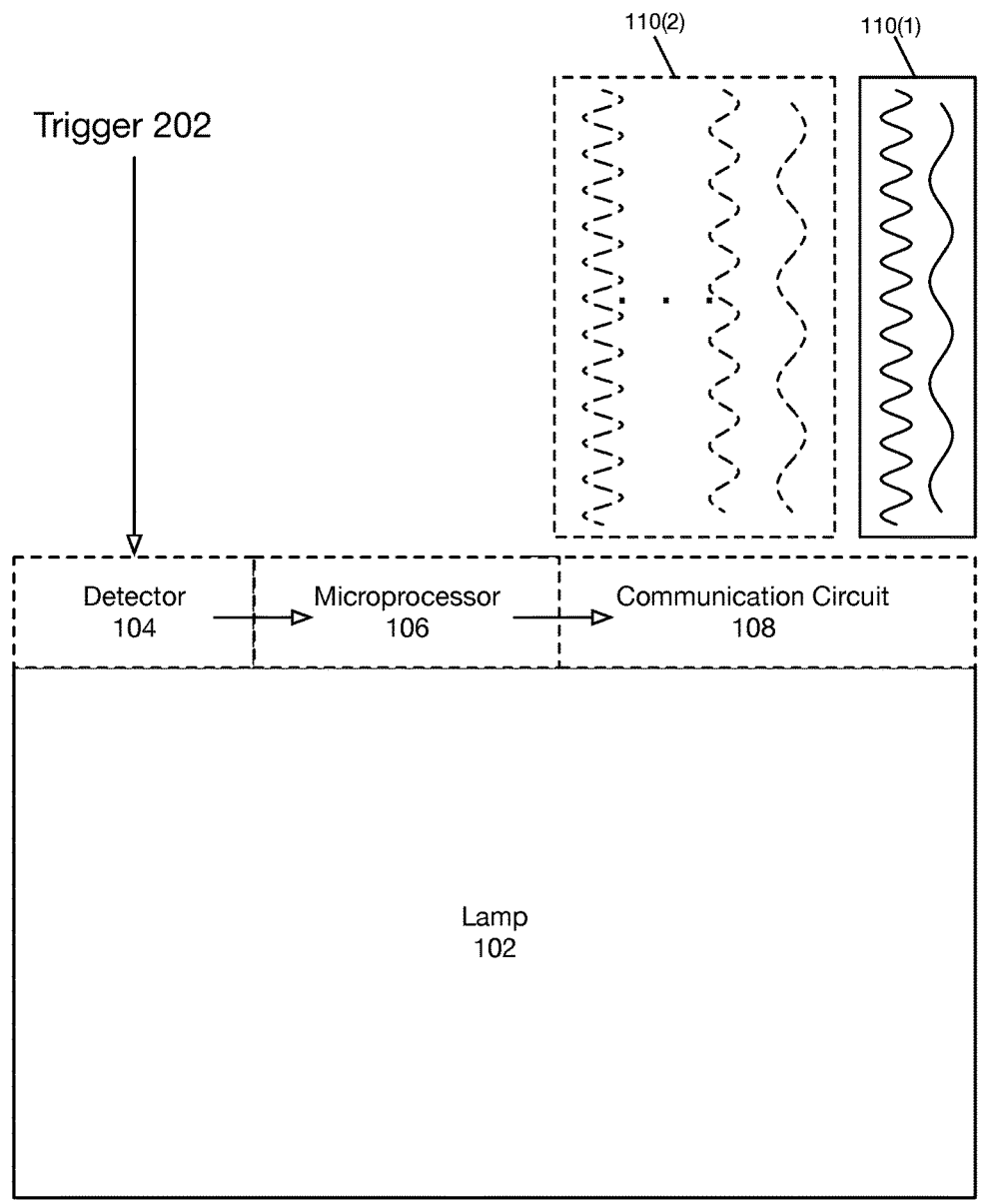
FIG. 2 further illustrates a block diagram of a system for providing ultra-low power standby consumption for a lamp according to one embodiment.

FIG. 2 further illustrates a block diagram of a system for providing ultra-low power standby consumption for a lamp according to one embodiment. As previously described with respect to FIG. 1, detector 104 may operate to detect any number of trigger events 202. Upon detection of recognized trigger events 202, detector 104 may provide a signal to microprocessor 106. In turn, microprocessor 106 may operate to control communication circuit 108 in response to a signal received from detector 104.

FIG. 2 also shows two exemplary communication protocols, 110(2) and 110(2). As shown in FIG. 2, communication protocol 110(1) may utilize two carrier frequencies while communication protocol 110(2) may utilize a larger number of carrier frequencies as indicated by the ellipsis shown.

Figure 3:
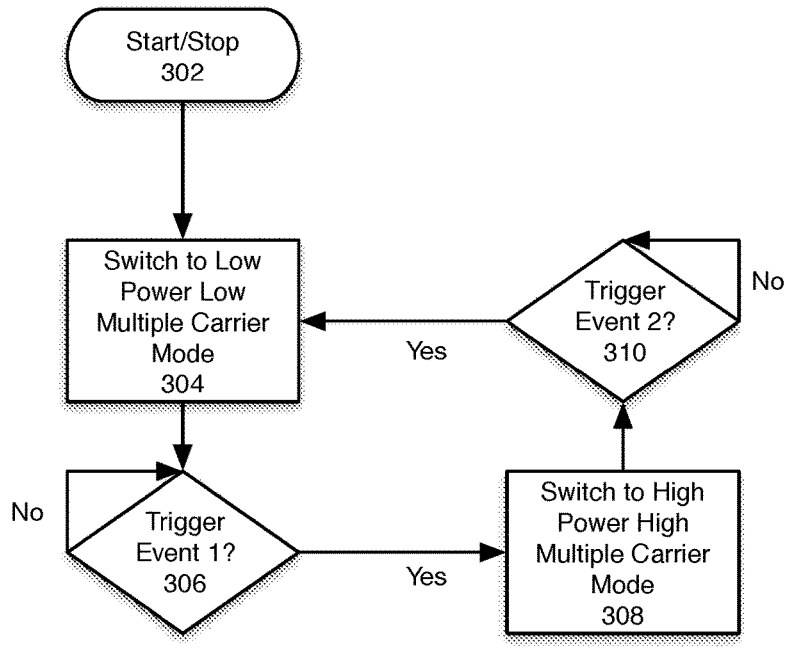
FIG. 3 is a flowchart depicting an operation of a system for providing ultra-low power standby consumption according to one embodiment.

FIG. 3 is a flowchart depicting an operation of a system for providing ultra-low power standby consumption according to one embodiment. The exemplary process shown in FIG. 3 assumes power consumption is selected by choosing a communication protocol with a higher or lower number of carrier frequencies. However, this is merely exemplary, and other modes of operation for selecting particular power consumption modes are possible.

The process is initiated in 302. In 304, the system switches to a low-power mode utilizing a lower number of carrier frequencies. In 306, if a first trigger event is detected ('yes' branch of 306), the system switches to a high power mode utilizing a higher number of carrier frequencies 308. Otherwise ('no' branch of 306), the system continues to wait for an event trigger. In 310, the system waits for a second event trigger. If no trigger is detected ('no' branch of 310) the system continues to wait. Otherwise ('yes' branch of 310), in 304 the system switches to a low-power mode utilizing a lower number of carrier frequencies.

In this embodiment the mere presence of one or two carriers can be used to enable the higher-consumption protocol, but a simple and specific data transmission will increase reliability of the trigger. Note that no errors in data occur when there are false-positive triggers; this merely causes the high-bandwidth communications to be enabled. Thus, spurious noise on the line will likely not cause errors in transmission, but rather slightly elevated power consumption of the system. This maintains reliability of the lighting commands which is paramount to the application.

The transition from high-power mode to standby mode may be triggered by various events, including: no data/command is transmitted over a period of time (such as 1 s, 5 s, 10 s, 60 s, 600 s); a specific "standby" command is sent to the lamp; the lamp's optical output is turned off; it is determined that no user is present in a given location. In addition, some embodiments comprise a network of connected smart lamps which can communicate (through wired communication, wireless communication, or a combination thereof). In some embodiments, the smart lamp is connected to a smart network and another element of the network (a computer, sensor, smart thermostat, smart appliance, etc.) determines whether the lamp should go to standby state (for instance because it has been determined that all users have left a room or a building, or are asleep).

The transition from standby mode to high-power mode may be triggered by various event, including: time of day; a specific "high-power" command is sent to the lamp; a sensor detects the presence of a user; a computer system infers that a user will soon be communicating with the lamp (for instance based on predetermined programming or based on machine learning) and sends a command to the lamp.

Transition between passive and standby mode may be controlled by explicit commands (stemming from the user or another computer or smart component), or be based on algorithms which may include various inputs (time of day, presence of user and his activity, environmental factors such as level of ambient light) to determine that a transition is adequate. These algorithms may be deterministic or have a machine-learning component.

For instance, in an embodiment, a network of smart appliances is installed is a home. The network comprises computers, sensors, and smart lamps. Based on machine learning, the computers in the network learn to determine that specific actions of the user (e.g. waking up, stepping up from a couch, moving from a room to another) are indicative that a command may be sent to the lamp; accordingly, a processor sends a command to the lamp to switch to active mode. Further, based on machine learning, the computers in the network learn to determine that specific environmental conditions (e.g. outside light levels going down, temperature changes) are indicative that a command may be sent to the lamp; accordingly, a processor sends a command to the lamp to switch to active mode. Based on machine learning, the computers in the network learn to determine that specific actions of the user (e.g. falling asleep, leaving a room or the home, turning on a TV, engaging in reading, talking to someone else) are indicative that a command is unlikely to be sent to the lamp; accordingly, a processor sends a command to the lamp to switch to standby mode.

Some embodiments apply to professional spaces, such as office spaces, rather than homes. In some embodiments, a network of smart lamps is installed in an office and can transition between active and standby modes to reduce power consumption. This may be tied to occupancy sensing with standard sensors installed in office rooms. For instance, when all occupants leave a room, the lamp is put in standby mode, and when a person enters a room, the lamp is put in active mode.

In some embodiments, the lamp is electrically coupled to a switch (such as a wall switch, which may have an open/close button and/or a dimmer knob). Standard (legacy) switches can completely shut down the power to a lamp; this is not desirable in the case of a smart lamp, which must retain some access to power at all times. Therefore, some embodiments include a "smart switch" which still allows a power to flow through the switch, even in off (or open) position—in other words, the off position is in fact a pseudo-off position which still allows the smart lamp to draw a minimal amount of power. Accordingly, when the switch is operated to an off/open position, the lamp's light output may go off, and the lamp goes in low-power standby mode, where the second communication protocol is used. The lamp can go back to high-power mode when the switch is operated to another state. The switch may be analog (i.e. have a physical slider or knob) or digital. In the latter case, the switch may further communicate with a smart item (such as a phone, watch, tablet, and computer) which may toggle the switch between pseudo-off and on.

In some embodiments, the lamp is controlled by a computer system (including a cloud computer, a smart accessory such as a watch or phone or tablet, or a voice-activated computer, etc.). The communication employs both protocols CP1 and CP2. Therefore, the lamp can be switched from standby low-power mode to high-power mode by the computer.

In some embodiments, the lamp is controlled by another lamp. For instance, in a network of smart lamps, if one lamp has received an instruction ("go to standby mode" or "go to high-power mode"), it can propagate this instruction to other lamps in the network or in a given group of lamps. Other lamps may then acknowledge receiving the instruction before going to standby mode. More generally, the lamp is part of a smart network and one element in the network (a computer, appliance or other) may send standby or active commands to a lamp or group of lamps.

Although this disclosure mentions lamps, it should be understood that this is used as a generic term for lighting products; a variety of smart lighting products (including fixtures) may benefit from implementation of the invention. Additionally, aside from lamps, the present invention can be practiced with any device having functional circuitry that connects to a powerline and has active and standby modes. Examples of such devices include appliances (e.g., televisions, HVAC components, refrigerators, ovens, etc.), telecommunications, sensors, cameras, and any other device that tends to have active and standby modes. One of skill in the art can readily understand the functional circuitry of these devices, which typically includes a power circuit, a control circuit and sometimes a work element such as a motor, electromagnetic wave generator, photonic emitter/detector, heating element, etc.

In an exemplary embodiment, the "wake" signal (transition from standby to active) is transmitted over a low power protocol that is an amplitude-modulated carrier wave at 120 kHz which encodes a specific byte. This carrier wave is detected by a circuit similar to that of an AM radio receiver. It consists of a tuned LC filter followed by an amplifier. The output of the amplifier is low-pass filtered and the resulting signal is interpreted as a serial binary data stream by a small microprocessor. When the microprocessor detects a certain pattern of binary data corresponding to the specific byte, it sends a signal to the high-power protocol device to become active. The power consumption of this particular low-power protocol is very low since it consists of a simple transistor amplifier and a small MCU and may be around 5 mW. The "wake" signal is sent by another device (for example a special wall switch) which would like to communicate with the "sleeping" device but cannot do so using the high-power communication protocol. As just demonstrated, in some embodiments, a dedicated electronic circuit is present in the lamp to detect the wake signal. The circuit is designed to detect the signal while maintaining a very low consumption. The circuit may or may not include a processor or a chipset.

These and other advantages maybe realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" are used as the plain-English equivalents of the respective terms "comprising" and "wherein." Moreover, in the following claims, the terms "first," "second," and "third," etc. are used merely as labels, and are not intended to impose numerical requirements on their objects.

What is claimed is:

1. A smart lamp for communicating with one or more devices, said smart lamp comprising:
   a lamp having on and off modes; and
   a processor configured to operate said lamp, said processor having at least active and standby modes of operation, in said active mode, said processor uses a first communication protocol to communicate with at least one of said one or more devices, said first communication protocol having a first power consumption and, in said standby mode, said processor uses a second communication protocol having a second power consumption, wherein said first power consumption is significantly higher than said second power consumption;
   wherein said processor is configured to operate in said standby mode until being switched to said active mode by a first trigger event; and
   wherein, after said process is switched to said active mode by said first trigger event, said processor is configured to switch back to said standby mode by a second trigger event.

2. The smart lamp of claim 1, wherein said first communication protocol has a first number of carrier frequencies and said second communication protocol has a second number of carrier frequencies, wherein said second number of carrier frequencies is less than said first number of carrier frequencies.

3. The smart lamp of claim 2, wherein said processor is configured to select between said active and standby modes based at least partially on detecting at least one of said carrier frequencies associated only with the first communication protocol.

4. The smart lamp of claim 1, wherein said first communication protocol is powerline communication (PLC) protocol.

5. The smart lamp of claim 4, wherein said first communication protocol is HomePlug or GreenPhy protocol.

6. The smart lamp of claim 4, wherein said second communication protocol utilizes amplitude modulation.

7. The smart lamp of claim 1, wherein said processor is configured to select between said active and standby modes based at least partially on detecting at least one of a particular carrier frequency, a particular voltage, a particular amplitude, a particular pattern of signals, a particular signal, a particular operational state, or after a particular duration.

8. The smart lamp of claim 7, wherein selecting one of a first communication protocol and a second communication protocol based upon an operational state of said lamp further comprises:
   detecting whether said lamp has received a communication within a predetermined period of time;
   if said lamp has received the communication, selecting the first communication protocol;
   otherwise, selecting the second communication protocol.

9. The smart lamp of claim 8, wherein the first communication protocol is selected by detecting a presence of at least one carrier frequency associated with the first communication protocol.

10. The smart lamp of claim 8, wherein the first communication protocol is selected by detecting a specific message.

11. The smart lamp of claim 8, where said second communication protocol is selected when a communication has not been received within a predetermined time.

12. The smart lamp of claim 8, wherein said second communication protocol is selected upon receipt of a predetermined communication and said first communication protocol was previously selected.

13. The smart lamp of claim 1, wherein said second communication protocol is selected during an operation statin in which light output is set to zero.

14. The smart lamp of claim 1, wherein the first power consumption is above 0.5 W and the second power consumption is below 0.5 W.

15. A smart device having an on and off mode and connected to a powerline along with one or more devices, said smart device; comprising:
   functional circuitry;
   a connection to said powerline;
   a processor configured to operate said functional circuitry, said processor having at least active and standby modes of operation, in said active mode, said processor uses a first communication protocol to communicate with at least one of said one or more devices over said powerline, said first communication protocol having a first power consumption, and, in said standby mode, said processor uses a second communication protocol having a second power consumption, wherein said first power consumption is significantly higher than said second power consumption;
   wherein said processor is configured to operate in said standby mode until being switched to said active mode by a first trigger event; and
   wherein, after said process is switched to said active mode by said first trigger event, said processor is configured to switch back to said standby mode by a second trigger event.

16. The smart device of claim 15, wherein said functional circuitry is a power circuitry of a lamp.

17. The smart device of claim 15, wherein said first communication protocol is powerline communication (PLC) protocol.

18. The smart device of claim 17, wherein said first communication protocol has a first number of carrier frequencies and said second communication protocol has a second number of carrier frequencies, wherein said second number of carrier frequencies is less than said first number of carrier frequencies.

19. A lamp having an on and off mode and configured for electrical connection to a powerline along with one or more other devices, said lamp comprising:

at least a first and second chipset associated with first and second communication protocols, respectively, said first chipset consuming more power when enabled than said second chipset when enabled;

a detector configured for connection to said powerline; and a processor configured to selectively enable one of said first and second chipsets based upon at least one trigger event on said powerline being detected by said detector;

wherein said processor is configured to use said second chipset until receiving a first trigger event to switch to said first chipset;

wherein, after switching to said first chipset after receiving said first trigger event, said processor is configured to switch back to said second chipset after receiving a second trigger event.

20. The lamp of claim 19, wherein each of said respective communication protocols associated with the first and second chipsets utilizes a respective number of carrier frequencies, which are different from one another.

21. The lamp of claim 20, wherein said processor selects said second chipset upon detecting that light output associated with said lamp is off or nearly off.

22. The smart lamp of claim 1,
wherein said first trigger event is at least one of (a) a wake-up signal from one of said one or more devices, (b) a schedule based on time of day or user habits, (c) switching said lamp to said on mode, or (d) a determination of occupancy near said lamp; and
wherein said second trigger event is at least one of (a) a lack of communication between said processor and at least one of said one or more devices for a certain period, (b) a standby signal from one of said one or more devices, (c) a schedule based on time of day or user habits, (d) switching said lamp to said off mode, or (e) a determination of non-occupancy near said lamp.

23. The smart device of claim 15,
wherein said first trigger event is at least one of (a) a wake-up signal from one of said one or more devices, (b) a schedule based on time of day or user habits, (c) switching said lamp to said on mode, or (d) a determination of occupancy near said lamp; and
wherein said second trigger event is at least one of (a) a lack of communication between said processor and at least one of said one or more devices for a certain period, (b) a standby signal from one of said one or more devices, (c) a schedule based on time of day or user habits, (d) switching said lamp to said off mode, or (e) a determination of non-occupancy near said lamp.

24. The lamp of claim 19,
wherein said first trigger event is at least one of (a) a wake-up signal from one of said one or more devices, (b) a schedule based on time of day or user habits, (c) switching said lamp to said on mode, or (d) a determination of occupancy near said lamp; and
wherein said second trigger event is at least one of (a) a lack of communication between said processor and at least one of said one or more devices for a certain period, (b) a standby signal from one of said one or more devices, (c) a schedule based on time of day or user habits, (d) switching said lamp to said off mode, or (e) a determination of non-occupancy near said lamp.

* * * * *